US005507375A

United States Patent [19]
Lee

[11] Patent Number: 5,507,375
[45] Date of Patent: Apr. 16, 1996

[54] CLUTCH FOR A GEARBOX

[76] Inventor: Sangchin Lee, Bessarabienstr. 4, 7140 Ludwigsburg, Germany

[21] Appl. No.: 108,590

[22] PCT Filed: Apr. 17, 1991

[86] PCT No.: PCT/EP91/00726

§ 371 Date: Aug. 27, 1993

§ 102(e) Date: Aug. 27, 1993

[87] PCT Pub. No.: WO92/18790

PCT Pub. Date: Oct. 29, 1992

[51] Int. Cl.$^6$ ............................. F16H 3/10; F16D 41/08
[52] U.S. Cl. ................. 192/38; 74/333; 192/47; 192/48.6; 192/48.92; 192/51
[58] Field of Search ................. 192/38, 48.6, 47, 192/48.92, 51, 53 H, 44; 74/337.5, 333

[56] References Cited

U.S. PATENT DOCUMENTS

| | | | |
|---|---|---|---|
| 1,985,127 | 12/1934 | Wemp | 192/47 X |
| 2,075,078 | 3/1937 | Allen | 192/48.92 X |
| 2,299,739 | 10/1942 | Colucci | 192/47 X |
| 2,403,378 | 7/1946 | Kilpela | 192/48.6 X |
| 2,567,446 | 9/1951 | Polomski | 74/368 |
| 3,426,874 | 2/1969 | Johnston | 192/38 |
| 3,958,679 | 5/1976 | Tamarin | 192/47 X |
| 4,284,183 | 8/1981 | Brisabois et al. | 192/38 X |
| 4,354,585 | 10/1982 | Ritter | 192/45 |
| 4,531,620 | 7/1985 | Stone | 192/47 X |
| 4,817,451 | 4/1989 | Weismann | 74/333 |
| 4,958,533 | 9/1990 | MacPherson | 74/333 |
| 4,987,790 | 1/1991 | Weismann | 192/47 X |
| 5,297,450 | 3/1994 | MacPherson | 74/333 |

FOREIGN PATENT DOCUMENTS

| | | |
|---|---|---|
| 587997 | 10/1933 | Germany . |
| 640233 | 7/1950 | United Kingdom . |
| 2164409 | 3/1986 | United Kingdom . |

*Primary Examiner*—Rodney H. Bonck
*Attorney, Agent, or Firm*—Jones, Tullar & Cooper

[57] ABSTRACT

A clutch for a gearbox comprises an input shaft (2) and an output shaft (3) on each of which pairs of gearwheels (4–9, 13–16) are mounted. The shaft (2, 3) or a clamping roller support (43) mounted on and entrained by the latter has clamping surfaces (17) around its periphery. Clamping rollers (10) are arranged between the clamping surfaces (17) and the inner surfaces (18) of the gearwheels (8, 9, 13–16). Shifter rods (20) arranged on a gear shifting plate (21) project into the spaces between the clamping rollers (10). The gear shifting plate (21) is entrained by first springs (35) on the associated shaft (2, 3) into a first relative position with respect to the shaft and can be displaced against the force of the springs (35) by a sliding piece (39 or 44) into a second relative position with respect to the shaft (2, 3). The sliding pieces (39, 44) are disposed on a synchronizer sleeve (37) mounted on a synchronizing assembly (27, 27', 27") on the shaft (2, 3). The synchronizing assembly (27, 27', 27") is entrained by the shaft (2, 3) but can move axially. When the shifter rod (21) moves from the first relative position into the second relative position, the clamping surfaces (17) and the inner surface (18) of the corresponding gear are brought into a non-positive clamping position (shifting position).

18 Claims, 9 Drawing Sheets

CLUTCH FOR A GEARBOX

BACKGROUND OF THE INVENTION

The present invention relates to a clutch for a gearbox with a gear wheel disposed at least on a shaft. The gear box can be selectively brought into a shift position wherein it is fixedly connected in at least one direction of rotation with the shaft, a neutral position in which it is freely rotatable in relation to the shaft, by clutch elements operated by means of a shift bushing.

It is disadvantageous in known gearboxes that synchronization of the gear wheels to be brought into engagement is necessary in order to be able to insert the gearbox into the individual shift positions. This means a considerable energy loss or a high fuel consumption.

Automatic transmissions, on the other hand, are very expensive, have a reduced degree of efficiency and result in greater fuel consumption.

SUMMARY OF THE INVENTION

It is therefore to an object of the invention to provide a clutch for a gearbox of the previously mentioned type, wherein for shifting of the gearbox of, for example a motor vehicle engine, during movement, a separation of the engine and the gearbox—by means of the customary clutch—is no longer necessary. At the same time it is intended to achieve a structural simplification. By means of this clutch a type of driving is to be made possible which is more economical with respect to energy or fuel consumption.

This object is attained in accordance with the present invention in that the shaft or a clamping roller support disposed on it and rotating along with it has clamping surfaces along its circumference. The clamping rollers are disposed between the clamping surfaces and the inner surfaces of the gear wheels with which they are associated, and the distance of the clamping surfaces from the respective inner surface of a gear wheel at the place of the least distance is less than the diameter of the clamping rollers. The place of the greatest distance is greater than the diameter of the clamping rollers, and furthermore shifting rods extend into the spaces between the clamping rollers and are disposed on a shifting disk. The shifting disk is dragged along via first springs by in associated shaft in a first relative position to it, and the shifting disk with the shifting rods can be displaced in relation to the shaft against the force of the said first springs into a second relative position. Displacement from the first relative position into the second relative position takes place by means of a sliding piece disposed on a shift bushing. The shift bushing is disposed on the shaft via a synchronizing body to be rotating along with it, but axially displaceable, and when the shifting disk is displaced from the first into the second relative position, the shifting rods push the clamping rollers via further springs into a frictional clamping position (shifting position) between the clamping surfaces and the inner surface of the respectively associated gear wheel.

Thus, clamping rollers, which by means of shifting rods can be brought into such a position that they make a frictional connection between the shaft and the gear wheel (shifting position), are disposed on one side between the shaft or a shifting disk body rotating along with the shaft, which is provided with clamping surfaces, and on the other side, which is the inner side of a gear wheel disposed above it. The shifting rods are simultaneously used as seats for the gear wheels. The shifting rods are disposed on a shifting disk. The shifting disks support leaf springs which act on the clamping rollers and can push them into or out of the clamping position. The shifting disk turns along with the drive shaft but is displaceable in relation to it in such a way that it is possible with its use to cause a displacement of the shifting rods via appropriate shifting devices. Either the clamping position is produced by the action of the shifting rods on the clamping rollers via the leaf springs, or the shifting rods take up such a position that the clamping rollers can move out of the clamping position. The shifting rods are dragged along by tension springs of the synchronizing body. The shifting position in which the clamping rollers are in a shifting position is caused by an axial displacement of a sliding piece which is fixedly disposed on the shift bushing. The shift bushing is actuated, in a known manner, by the shift linkage. This process can be accomplished rapidly and simply. Construction is simple. A large advantage lies in that a separation between engine and gearbox by means of the clutch is no longer required for further shifting.

The present invention also prevents free-wheeling during downhill driving, i.e. when the vehicle propels the engine, by an axial displacement of the shift bushing beyond the position causing the clamping of the clamping rollers, an interlocking connection being made between the gear wheels. With the engine propelling—i.e. during hill driving—this interlocking connection does not absorb any forces, because in this case the torque is being transferred by means of the frictional connection resulting from the clamping of the clamping rollers.

BRIEF DESCRIPTION OF THE DRAWINGS

An exemplary example of the invention and its advantageous further embodiments is described below, making reference to the attached drawings. Shown are in:

FIG. 8 which is a section along the line VIII—VIII in FIG. 1a; and

DETAILED DESCRIPTION OF THE PREFERRED EMBODIMENTS

Figure 1:
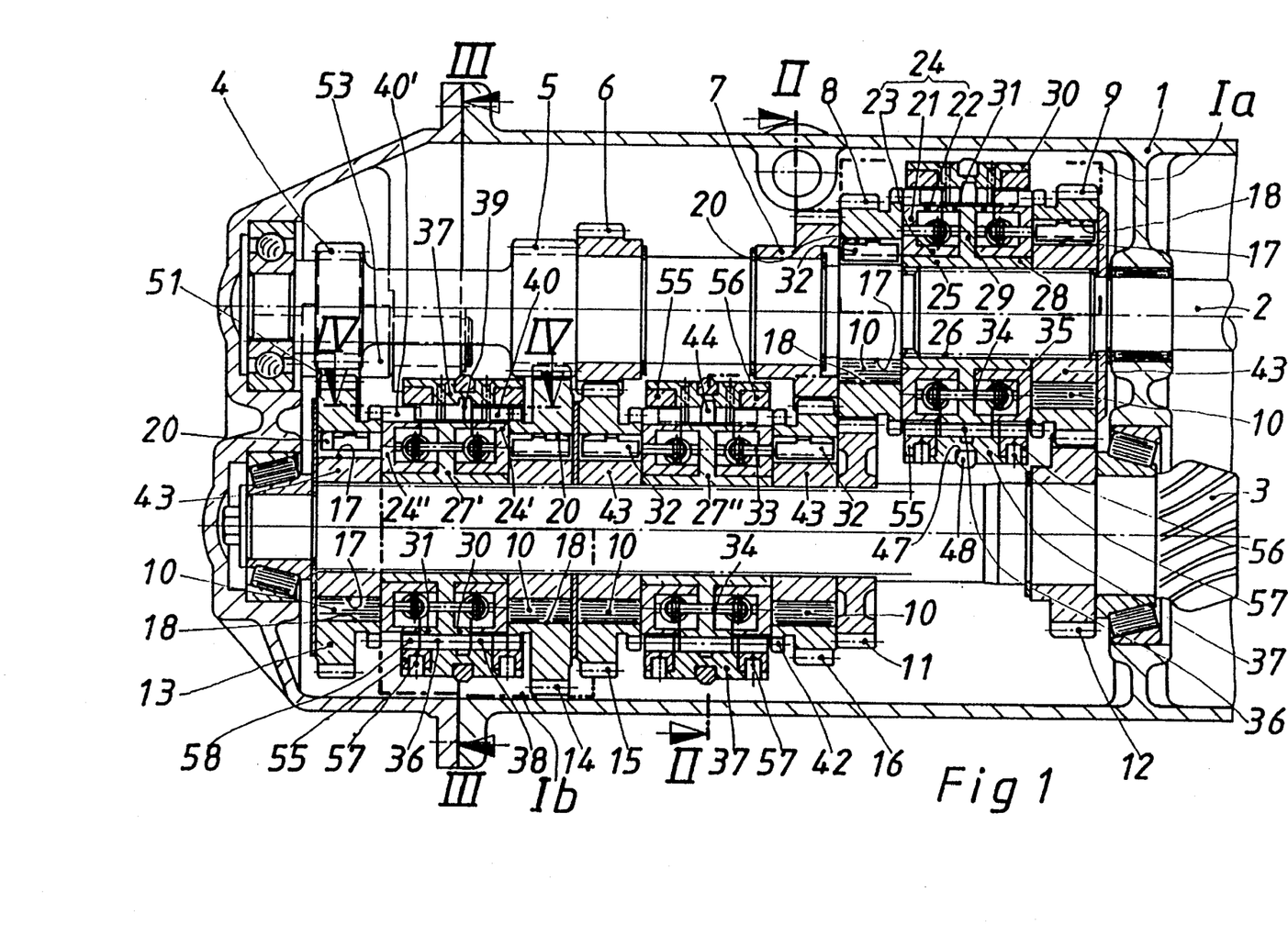
FIG. 1 which is a cross sectional view of an exemplary embodiment of the present invention.

FIG. 1 shows a gearbox with five forward gears and one reverse gear. To the extent that the construction equals that of conventional gearboxes, the specification assumes that its mode of operation is known to one of average skill in the art, so that short references will suffice.

A drive shaft 2 and a power take-off shaft 3 are seated in the housing 1. The drive shaft 2 is driven at its right end in FIG. 1 by an engine (not shown). The power take-off shaft 3 engages with its right end in FIG. 1 a differential gear (not shown), which propels the drive wheels (for example the front wheels) of a motor vehicle.

The gear wheel 4 for the reverse gear, the gear wheel 5 for the first gear, the gear wheel 6 for the second gear and the gear wheel 7 for the third gear are seated firmly wedged on the drive shaft 2. Furthermore, the gear wheel 8 for the fourth gear and the gear wheel 9 for the fifth gear are disposed surrounds the drive shaft 2. However, the gear wheels 8 (4th gear) and 9 (5th gear) are not directly connected with the drive shaft 2. These two last mentioned gear wheels are instead seated at a distance from but concentric with the drive shaft 2. Clamping rollers 10 and shifting rods 20 are disposed within the inner surfaces 18 of the gear wheels 8 and 9. The gear wheels 8 and 9 are seated on the shifting rods 20. In addition, the shifting rods 20 act on the clamping rollers 10 via the leaf springs 32 bent in a U-shape (see also FIGS. 2, 3, 5, 6). On the outside, the clamping rollers 10 are either seated—as with the gear wheel 8—directly on the outside of the drive shaft 2 provided with clamping surfaces 17, or—as with the gear wheel 9—on the clamping roll support body 43, also provided with clamping surfaces 17, which by means of the serration 26 is meshed with the drive shaft 2 so that it turns along with it. The clamping rollers 10 can be brought into two positions—as will be described later—, namely into a position (shifting position), in which they cause a frictionally engaged coupling of the drive shaft 2 with the gear wheels 8 or 9. If this is not the case, they are in the neutral position, in which the gear wheels can freely rotate on the drive shaft 2.

A gear wheel 11 for the fourth gear and a gear wheel 12 for the fifth gear are fixedly disposed on the power take-off shaft 3. Furthermore, a gear wheel 13 for the reverse gear, a gear wheel 14 for the first gear, a gear wheel 15 for the second gear and a gear wheel 16 for the third gear are seated in the same way as already described above in connection with the gear wheels 8 and 9.

Figures 2, 2A, 2B:
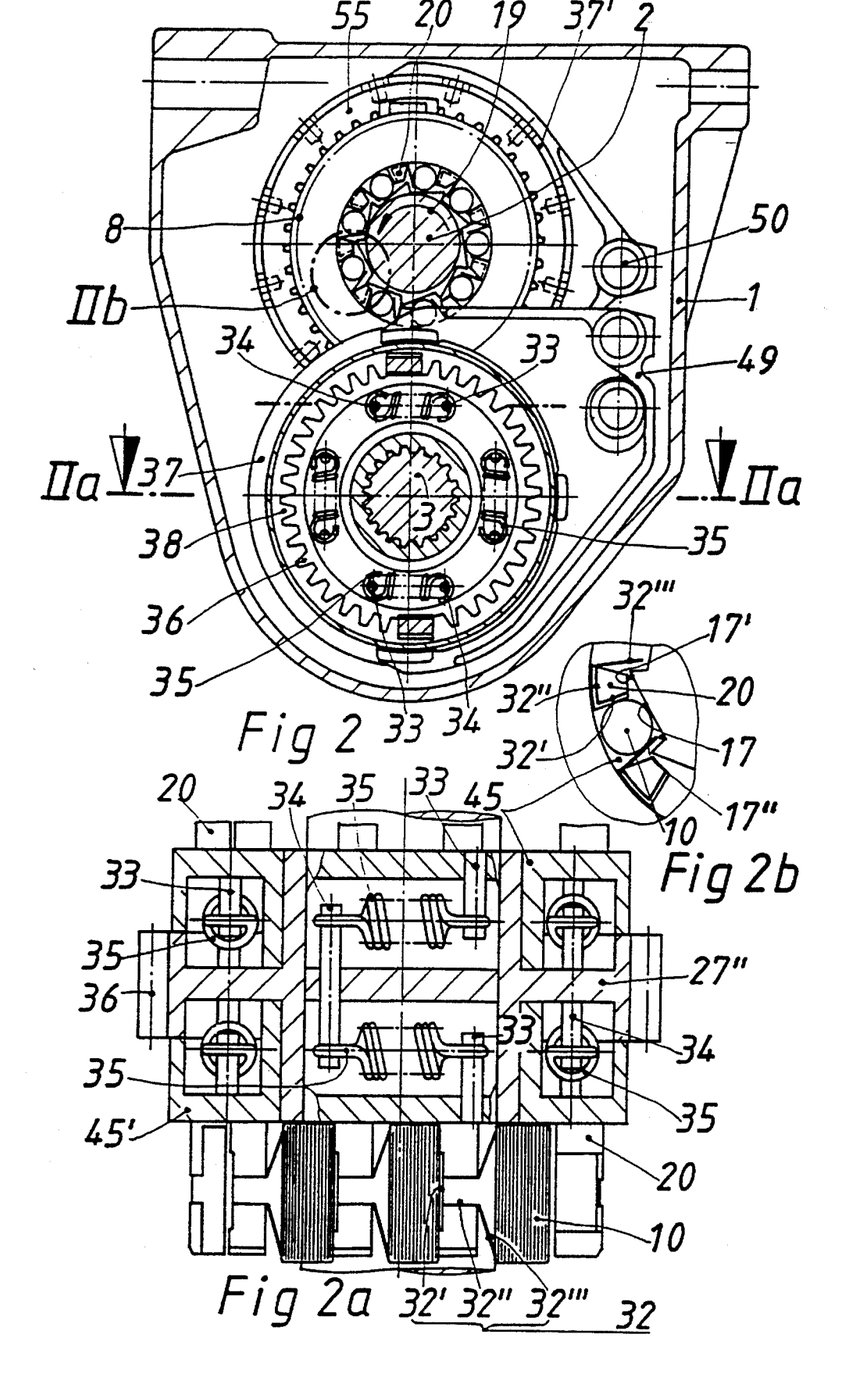
FIG. 2 which is a section along the line II—II of FIG. 1.
FIG. 2a which is an enlarged section along the line IIa—IIa of FIG. 2.
FIG. 2b which is an enlarged view of the area IIb of FIG. 2.
Figures 3, 3A:
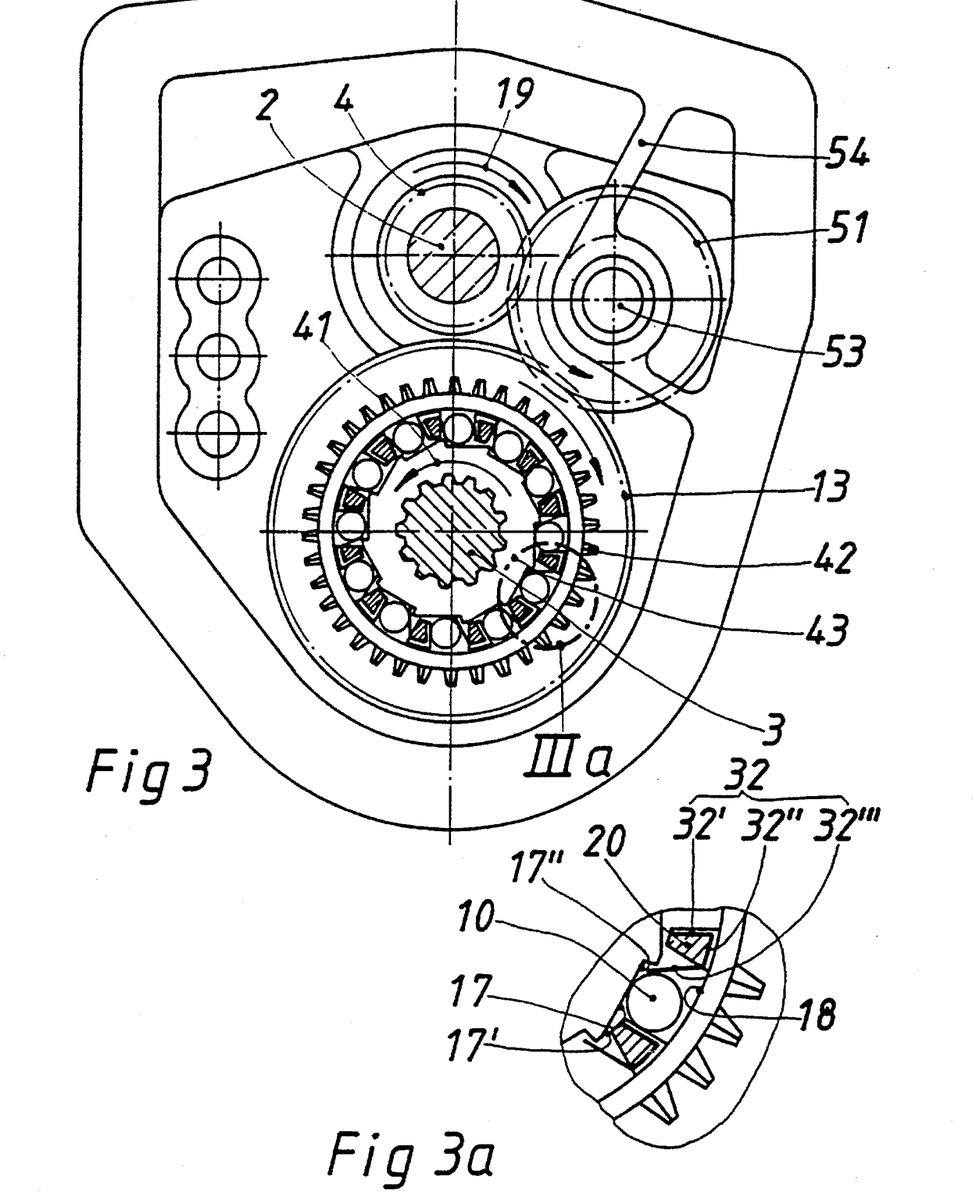
FIG. 3 which is a section in the direction of the arrows III—III in FIG. 1.
FIG. 3a which is an enlarged view of the area IIIa in FIG. 3.

As already mentioned and as can also be seen from FIG. 2, the gear wheel 8 is seated at a distance from but concentric with the drive shaft 2, seated on the shifting rods 20. The drive shaft 2 is provided along its circumference with a plurality of clamping surfaces 17. The clamping surfaces 17 are obliquely seated in relation to an imagined tangential line at a circle around the axis of the drive shaft 2 in such a way that their distance from the inner surface 18 of the gear wheel 8 at the point 17', (FIG. 2b) where the distance is the shortest, is less than the diameter of the clamping roller 10. In contrast to this, at the point 17" where the distance is the greatest, this distance is greater than the diameter of the clamping roller 10. Therefore, if the clamping roller 10 in FIG. 2 is turned clockwise with respect to the drive shaft 2, and if in this case the drive shaft rotates counterclockwise (in the direction of the arrow 19), clamping of the clamping roller 10 between the clamping surface 17 of the drive shaft 2 and the inner surface 18 of the gear wheel 8 takes place. With respect to the position the clamping rollers 10 have in FIG. 2, a slight clockwise displacement toward the right, i.e. against the direction of rotation of the drive shaft 2 indicated by the arrow 19 takes place in this case. In this position a frictional connection between the drive shaft 2 and the gear wheel 8 has been made. This is the "shifting position". It remains as long as the drive shaft 2 is driven.

However, if the clamping rollers 10 are displaced in relation to the drive shaft 2 counterclockwise with respect to the position drawn in FIG. 2, they are at the position where their diameter is less than the distance between the clamping surface 17 and the inner surface 18 of the gear wheel, so that the gear wheel 8 can free-wheel in relation to the shaft 2 (neutral position).

As can also be seen from FIG. 2b, shifting rods 20, which are approximately trapeze-shaped in cross section, are disposed along the circumference of the drive shaft 2 between the clamping rollers 10. These shifting rods are disposed along the circumference of shifting disk 21 (see FIG. 1a). The shifting disk 21 is a part of the shifting disk body 24, which in addition comprises the outer rim 22 and the inner rim 23. The shifting disk body 24 thus has the form of a U-shaped annular body. The shifting rods 20 are seated on the shifting disk 21 somewhat in the form of a cage. The shifting disk body 24 is rotatably seated on the left lower flange 25 of a synchronizing body 27, which is fixedly disposed on the drive shaft 2 by means of a serration 26 and therefore rotates along with it, and it has in addition a right lower flange 28, a center bar 29, a left upper flange 31 and a right upper flange 30.

If the shifting disk body 24 and together with it the shifting disk 21 is displaced on the synchronizing body 27, either—as described—a frictional clamping of the clamping rollers 10 between the clamping surface 17 of the drive shaft 2 and the inner surface 18 of the gear wheel 8, and thus a connection in the drive direction (arrow 19) is caused, or—with a displacement of the shifting disk body 24 in the opposite direction—the frictionally engaged connection is released, so that the drive shaft 2 and the gear wheel 8 can free-wheel with respect to each other. These two positions of the shifting disk body 24 on the synchronizing body are "relative" positions of the shifting disk body 24 or the shifting disk 21 with respect to the drive shaft 2 or the clamping roller support 43.

The action of the shifting rods 20, fixedly attached to the shifting disk 21, on the clamping rollers 10 does not take place directly, but via leaf springs 32 (see FIG. 2b). They are bent into a U-shape; they are seated with their shorter legs 32' and their center bar 32" in a groove in the shifting rod 20; with their free, longer leg 32''' they respectively press against a clamping roller 10.

The inclination of the clamping surfaces 17 must be set in such a way that the frictional forces with which the clamping surfaces 17 act on the clamping rollers 20 when the engine is being operated press the clamping rollers 10 further into the clamped position. Thus, the clamping surfaces 17 of the drive shaft 2 or the clamping roller support body 43 are inclined at the gear wheels 8 and 9 in such a way that the distance from the inner surfaces 18 is decreased in a clockwise direction (opposite the drive direction indicated by the arrow 19).

Figure 5:
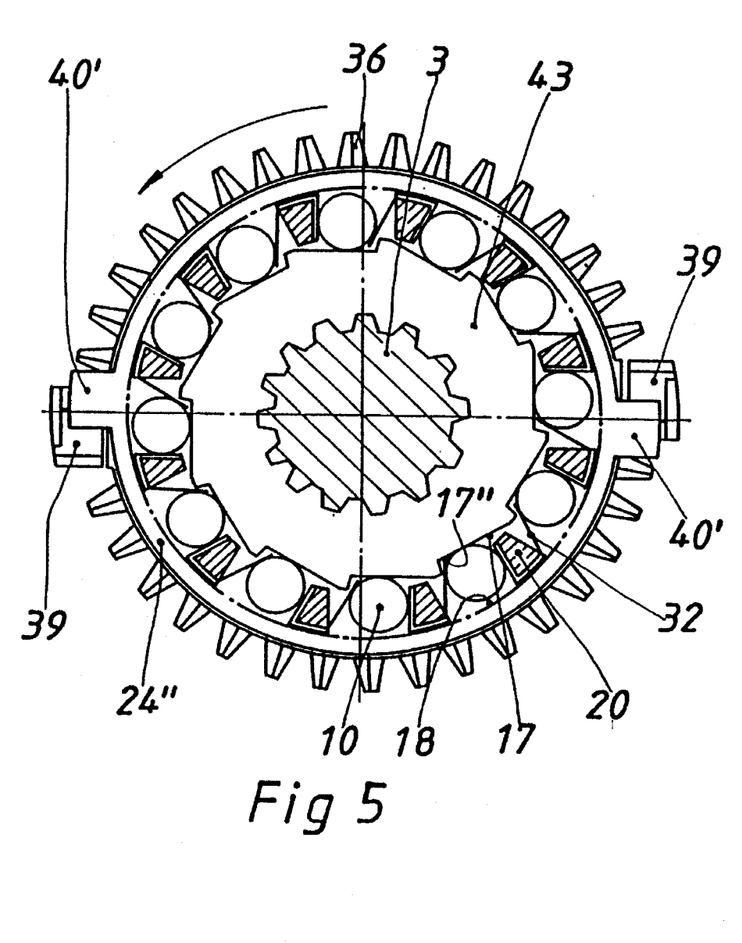
FIG. 5 a view in the direction of the arrows V—V (gear wheel 13 for the reverse gear) in FIG. 4.

However if the gear wheel is driven by the engine and drives the shaft, for example as with the gear wheel 13 seated on the power take-off shaft, the inclination of the clamping surfaces must be reversed, namely such as is shown in FIG. 5. In FIG. 5 the gear wheel 13 turning above the clamping rollers 10 and the shifting rods 20 is not shown. But it can be seen in FIG. 3 that in this case it is the outer gear wheel 13 which, if it is driven counterclockwise by the gear wheel 4—via the gear wheel 51 because of the reversal of motion necessary for the reverse gear—presses the clamping rollers 10 into the clamped position between the clamping surfaces 17 and the inner surface 18 of the associated gear wheel 13.

But if the vehicle propels the engine (for example during downhill driving or when the gas pedal has been released), it can be seen from FIGS. 2, 2b that the gear wheel 8 is being turned in the direction of the arrow 19 faster than the drive shaft 2. The gear wheel 8 "passes" the drive shaft 2. Clamping is then released. The result is free-wheeling in the neutral position.

Figure 4:
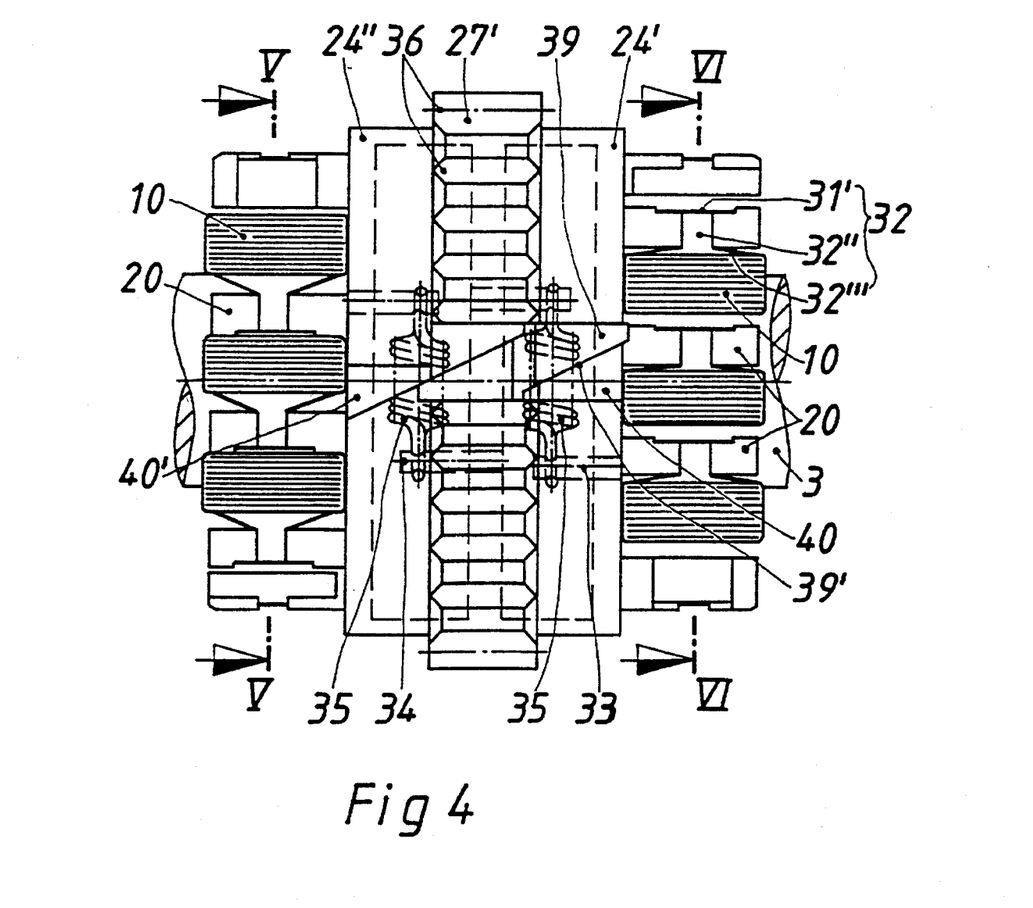
FIG. 4 which is a view in the direction of the arrows IV—IV in FIG. 1, but in such a way that for the sake of clarity the gear wheels 13 and 14 and the shift bushing 37 have been removed, but not the sliding piece 39.

The same is the result in FIGS. 4 and 5 if the power takeoff shaft turns faster than the gear wheels 13 to 16 seated on it.

Figure 1A:
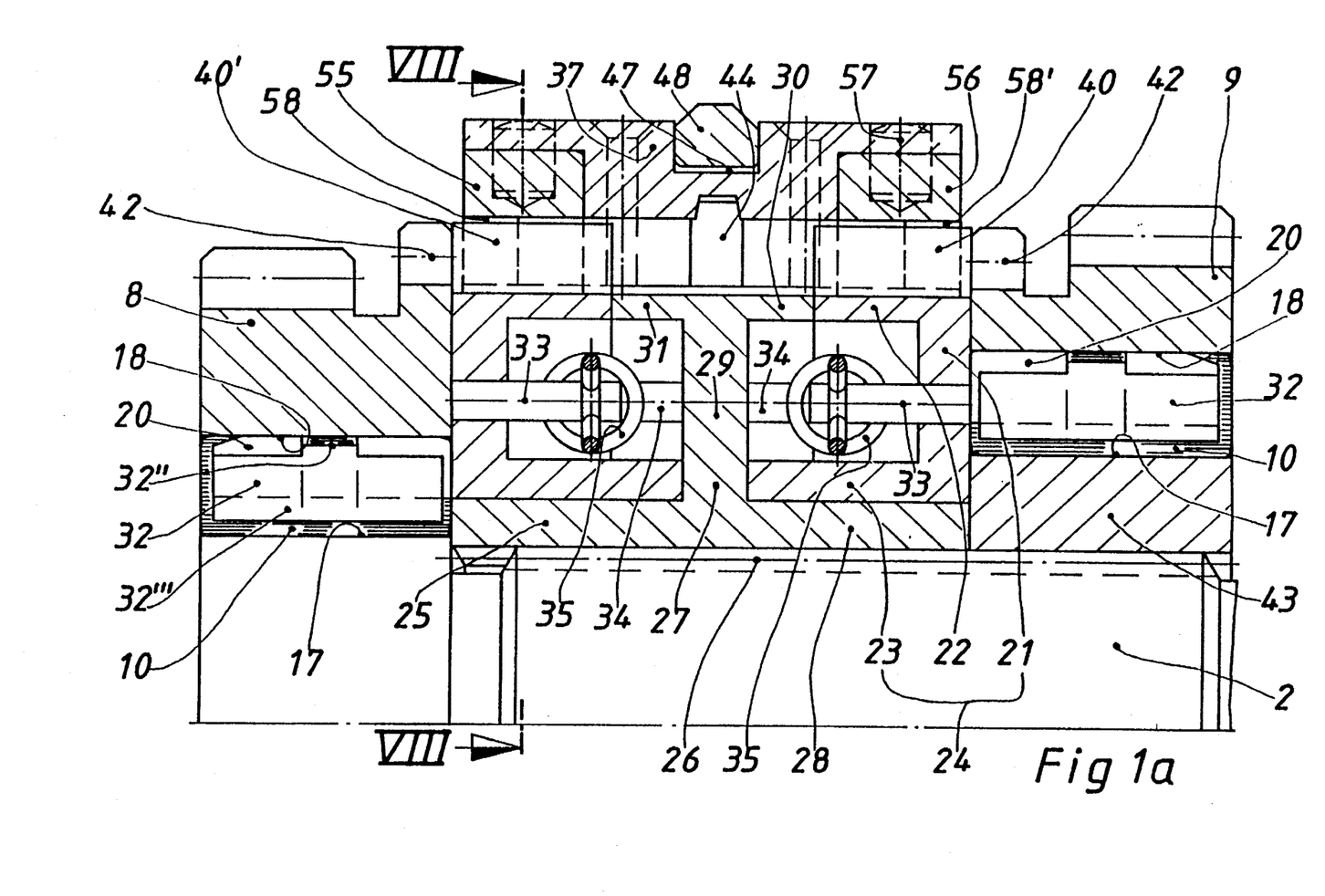
FIG. 1a which is an enlarged view of the area Ia of FIG. 1.

It can be seen from FIG. 1a that bolts 33 are provided on the shifting disks 21. Furthermore, bolts 34 have been provided on the center bar 29 of the synchronous body 27. Tension springs 35 have been suspended between the bolts 33 and the bolts 34. These tension springs 35 pull the bolts 33 and 34 against each other. This can also be seen in FIGS. 2a and 4. Because of this, the shifting disk body 24 is always dragged along by the synchronous body 27 in an exactly determined relative position. In the relative position which is the one in accordance with FIG. 2, the gear wheel 8 can free-wheel with respect to the drive shaft 2. Only when the shifting disk body 24 is displaced on the synchronous body 27 against the force of the spring 35 in a direction opposite that of the arrow 19, does the second relative position result and in it frictionally engaged clamping.

The arrangement of four of the springs 35 along the circumference of a shifting disk 21 can also be seen in FIG. 2 (lower portion), but only during the cooperation of the gear wheel 11 with the power take-off shaft 3. However, the arrangement is the same for the gear wheels 8 or 9.

Displacement of the shifting disk body 24 will respect to the synchronous body 27 at the gear wheels 8 or 9 takes place in a way that will be described below for the shifting disk bodies 24', 24" and the synchronous body 27' (to the left in FIG. 1) with respect to the gear wheels 13, 14. The synchronous body 27' is seated by means of a serration on the power take-off shaft 3. The synchronous body 27' has been provided radially on the exterior, adjoining the flanges 30, 31, with a gear rim consisting of teeth 36 (see also FIG. 2). The shift bushing 37, which has a gear rim consisting of teeth 38 on the inside, is seated on these teeth 36. Respectively one sliding piece 39 is provided on this shift bushing 37 at two diametrically opposite places on the circumference. A sliding piece 39 (however without the shift bushing 37, which was omitted to show the parts located underneath it; see also FIG. 5a) can be seen in FIG. 4. Also, see FIG. 1—at 27 and 27'–and 1a. However, the teeth 36 of the synchronous body 27' on which the shift bushing 37 can be moved back and forth in the axial direction can be seen in FIG. 4. The sliding piece 39, which has two sliding surfaces 39' and 39", is displaced along with the shift bushing 37—as can be seen in FIG. 4. The sliding surface 39' acts on one of the sliding pieces 40 on the shifting disk body 24' (FIG. 6); the sliding surface 39" acts on one of the sliding pieces 40' on the shifting disk body 24" (FIG. 5). Placement of the sliding pieces 40", 40 against the sliding piece 39 is assured by the tension springs 35.

The following operation results: If the shift bushing 37 is displaced in the axial direction, either the sliding surface 39' presses on the sliding piece 40, or the sliding surface 39" presses on the sliding piece 40'. Depending on the movement the shift bushing 37 and, along with it the sliding piece 39, now perform, either the shifting disk body 24' or the shifting disk body 24" are now turned with respect to the synchronous body 27'. Along with this a corresponding displacement of the shifting rods 20 in the circumferential direction and along with it a frictionally engaged coupling of the clamping rollers 10 between the respective clamping surfaces 17 and the respective inner surfaces 18 of the associated gear wheels takes place. In this way one of the gear wheels 13 or 14 is frictionally engaged with the power take-off shaft 3 and in this way brought into the shifting position. At the same time the other gear wheel takes up the neutral position.

If the shift bushing 37, seated in FIG. 1 between the gear wheels 13, 14, is displaced toward the right, then the position shown in FIG. 4 results for the sliding piece 39. The sliding surface 39' then presses on the sliding piece 40, which is connected with the shifting disk body 24', so that the latter is turned in a clockwise direction in the direction of the arrow 41 in FIG. 6 Along with the shifting disk body 24' the shifting rods 20 fastened on it also turn. Then the leaf springs 32 press the clamping rollers 10 into the clamping position near 17' (place of the shortest distance of the clamping surface 17 from the inner surface 18 of the gear wheel). The result then is the position shown in FIG. 6, wherein there is clamping (frictional engagement) between the clamping surfaces 17 and the inner surface 18 of the gear wheel 14 (which, however, has been omitted in FIGS. 4, 6 for reasons of clarity; but its position can be seen in FIG. 1). In this way the first gear is engaged. Simultaneously the sliding piece 40' turns in the circumferential direction in a clockwise direction on the shifting disk body 24" (on the left side of FIG. 4) under the influence of the tension springs 35 in such a way, that the shifting rods 20 and along with them the leaf springs 32 move in a clockwise direction in FIG. 5 sufficiently far so that the shifting rods 20 directly act on the clamping rollers 10 resting against them in the clockwise direction, and in this way push them out of the clamping position (at 17')(into the position at 17"). At that time the gear wheel 13 can free-wheel with respect to the power take-off shaft 3 (FIG. 5).

Up to now the "frictionally engaged" shift position of the shift bushing 37 has been described, i.e. to the extent that clamping of the clamping rollers 10 between the clamping surface 17 and the inner surface 18 of the respective gear wheel disposed above a clamping surface 17 takes place.

However, the shift bushing 37 can be further displaced in the axial direction beyond this described shift position in such a way that an interlocking connection is provided.

Figure 1B:
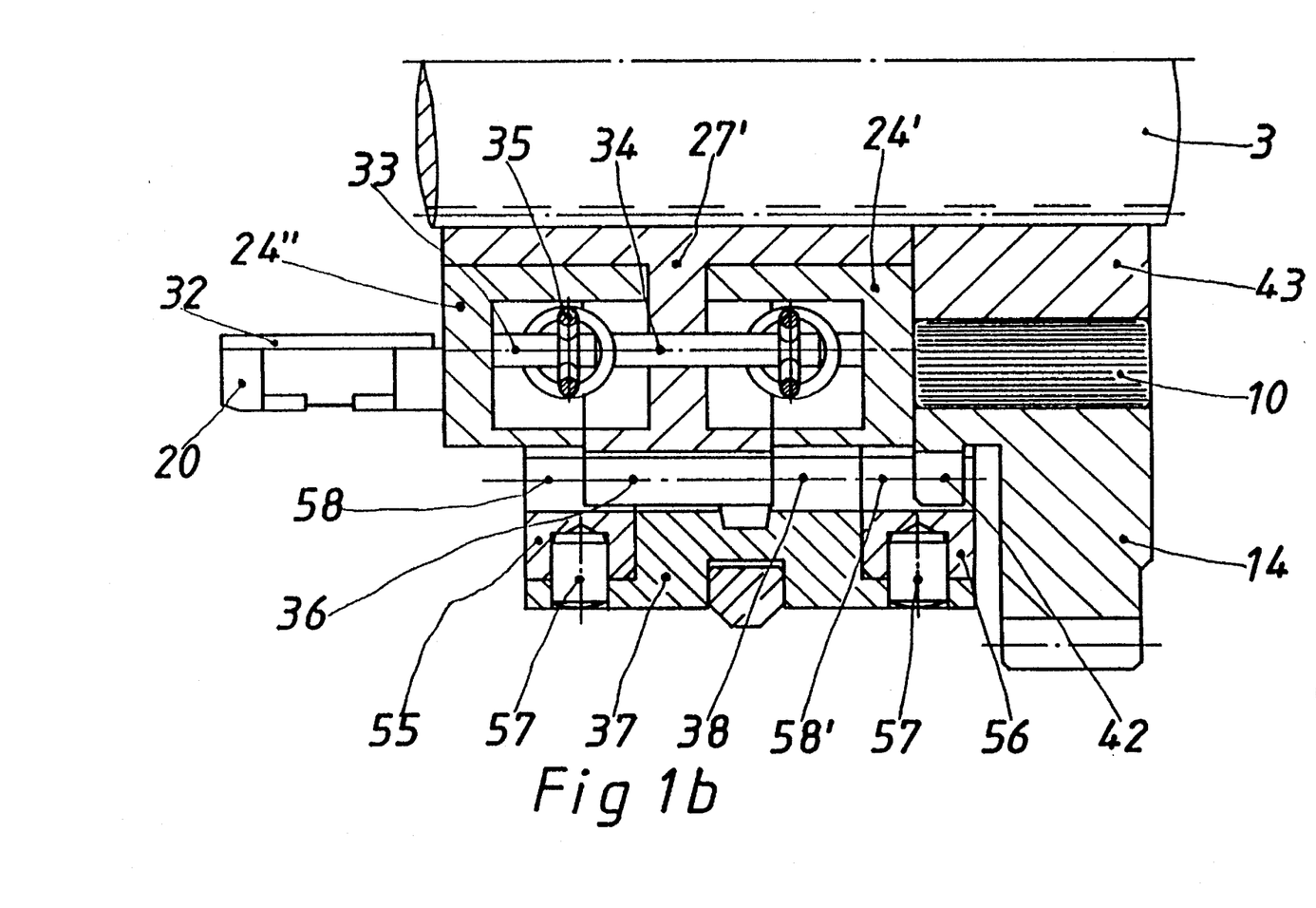
FIG. 1b which is enlarged view of the area Ib of FIG. 1.

As can best be seen in FIG. 1b, two synchronous rings, namely the left synchronous ring 55 and the right synchronous ring 56, are provided inside the shift bushing 37 for this purpose. Pins 57 are fixedly screwed into the synchronous rings 55, 56 or fixedly fastened to them in any other manner. The pins 57 extend into elongated holes 60 in the shift bushing 37 (see FIGS. 7a, 7b, 7c, 8), so that a certain displaceability along the circumference between the shift bushing 37 on the one hand and the synchronous rings 55, 56 on the other results. The synchronous rings 55, 56 are provided with a gear rim on the inside, formed by teeth 58, 58'.

If, again as best seen in FIG. 1, the shift bushing 37 has been pushed to the right far enough so that the teeth 58' provided on the inside of the right synchronous ring 56 extend over the teeth 42, which form a second gear rim on the gear wheel 14, an interlocking connection has been made, namely from the power take-off shaft 3 via the synchronous body 27' its teeth 36, the teeth 38 on the shift bushing 37, the synchronous rings 55 or 56—which are displaceable with respect to the shift bushing 37 within the limits of the elongated holes 60—, and the engagement of the teeth 58 or 58' provided therein with the teeth 42 on the respectively associated gear wheel.

The displaceability of the synchronous rings 55, 56 with respect to the shift bushing 37, such as is provided by the engagement of the pins 57, connected with the synchronous rings 55, 56, with the elongated holes 60, is used to assure a certain mobility along the circumference of the synchronous rings 55, 56 with respect to the shift bushing 37, so that—in the course of the already completed clamping (frictional engagement)—the teeth 58 or 58' can be displaced in respect to the shift bushing with such a way that an engagement of the teeth 58 or 58' with the teeth 42 is possible even if the clamping position is not attained exactly in such a way that the teeth 58, 58' and 42 fit into each other, but such that a certain amount of mobility for engagement is necessary. This interlocked connection even remains when the vehicle does the propelling (during downhill driving or when the throttle to the engine is closed). In this case the clamping of the clamping rollers 10 is released and free-wheeling actually takes place. But the interlocked connection then prevents the free-wheeling of the gear wheel as soon as the pins 57 rest against one of the ends of the elongated holes 60 (see FIG. 7c). Therefore the connection in the interlocked shifting position is maintained in any case. Thus FIG. 1b shows the shift position during the interlocked connection for the first gear (gear wheel 14). FIG. 1a shows the neutral center position in which the two adjoining gear wheels 8 and 9 are in the free-wheeling position.

The inner gear rims of the synchronous rings 55, 56 formed by the teeth 58, 58' are furthermore provided with recesses 59 (see FIG. 8), in which the sliding pieces 40, 40', 44 are placed If the sliding piece 39 is not pushed to the right—as shown in FIG. 4—but to the left, the right sliding piece 40 first returns into the center position. The shift bushing 37 (FIGS. 1, 1b) is removed from the interlocked connection with the teeth 42 of the gear wheel 14 and next the clamping roller support 43 also is removed from clamping with the inner surface 18 of the gear wheel 14 as a result of the fact that the shifting disk support 24' now can move back into its initial position (free-wheeling)— pulled by the tension springs 35—. With continued displacement of the sliding piece 39 toward the left, a connection of the gear wheel 13 with the associated clamping roller support 43 is made in a completely analogous manner and in this way the reverse gear is engaged. In this way it is possible to change the rotational driving direction directly from forward to reverse (or vice versa). This is of importance, for example, when the gear box is used in the drive of a ship or a machine tool.

Figure 5A:
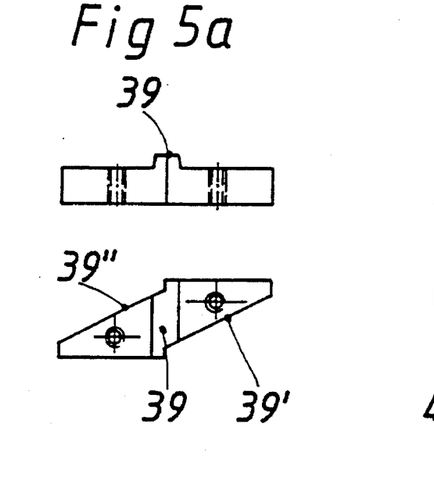
FIG. 5a which is a top view and lateral view of the sliding piece 39.
Figure 5B:
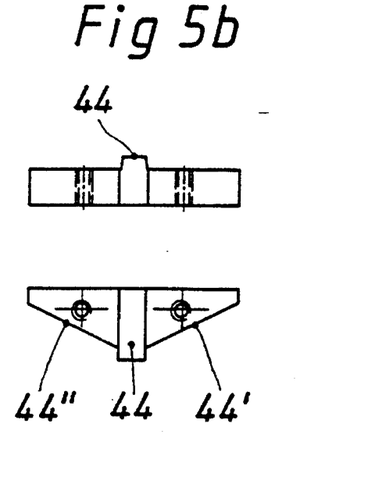
FIG. 5b which is a top view and lateral view of the sliding piece 44.
Figure 6:
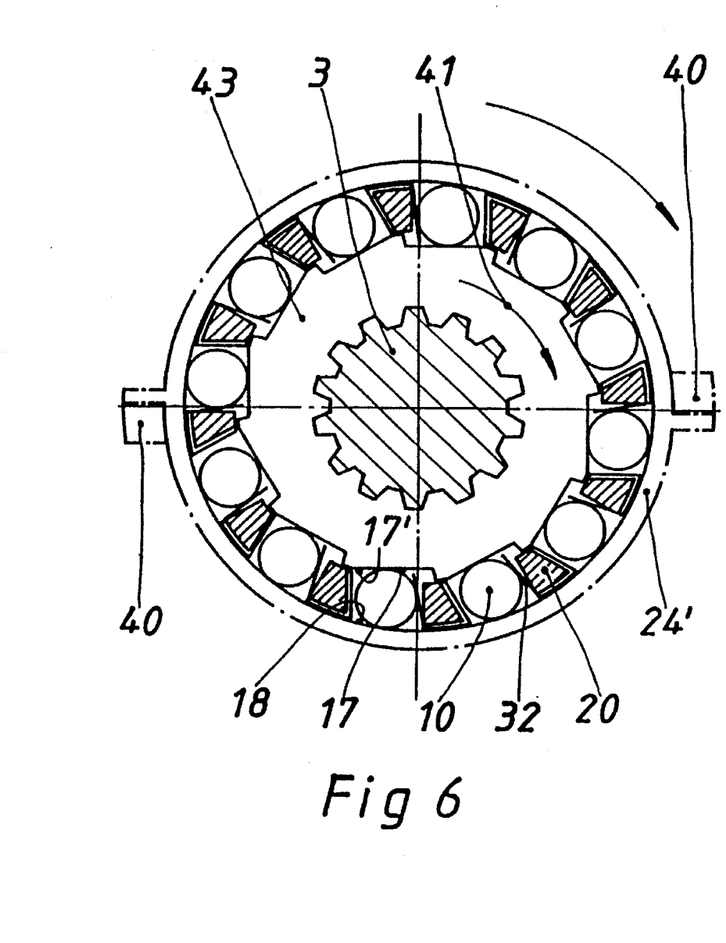
FIG. 6 which is a view in the direction of the arrow VI—VI (gear wheel 14 fox the first gear) in FIG. 4.

The special shape of the sliding piece 39 in accordance with FIG. 5a, wherein the sliding surfaces 39', 39" are parallel to each other, is necessitated by the change from the first forward gear to the reverse gear or vice versa. When changing from second gear to third gear—i.e. between gear wheels 16 and 17—and from fourth gear to fifth gear—i.e. between gear wheels 8 and 9—, the sliding piece 44 has the shape shown in FIG. 5b, in which the sliding surfaces 44', 44" are inclined in an opposite direction, so that they respectively cause a displacement of the associated shifting disk bodies with respect to the synchronous body into the same rotational direction. The various positions which the sliding piece 44 can take up during changing from neutral into the third gear are shown in FIGS. 7a, 7b, 7c.

Figure 7A:
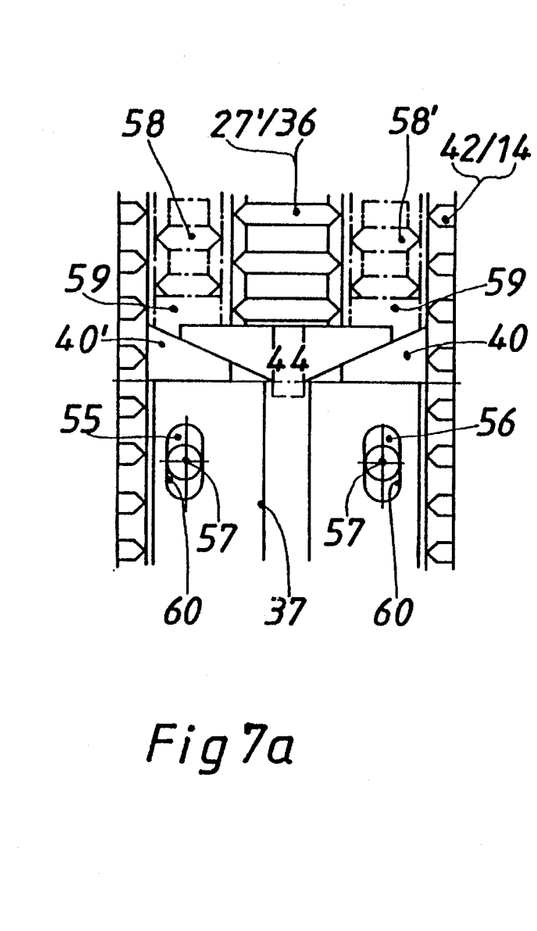
FIGS. 7a, which shows positions of the sliding piece 44 in the center, and FIGS. 7b, 7c position (neutral), first shift position (frictional clamping) and second gear position (interlocked synchronization)
Figure 7B:
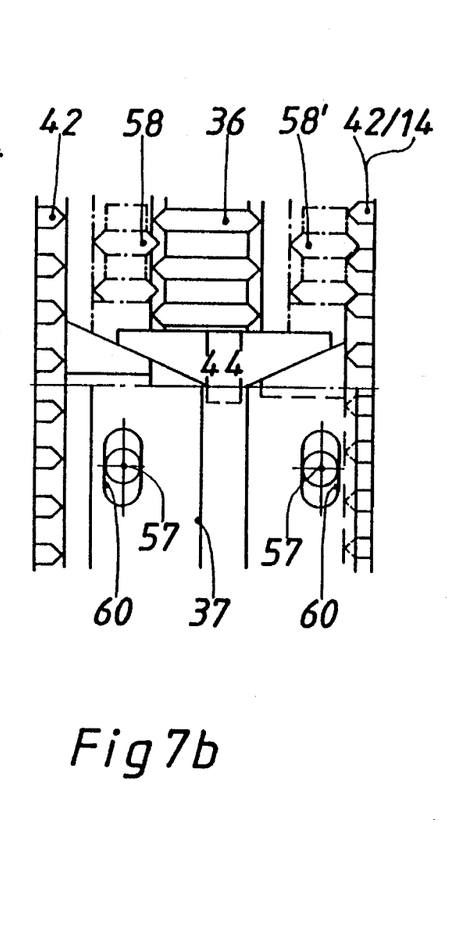
Figure 7C:
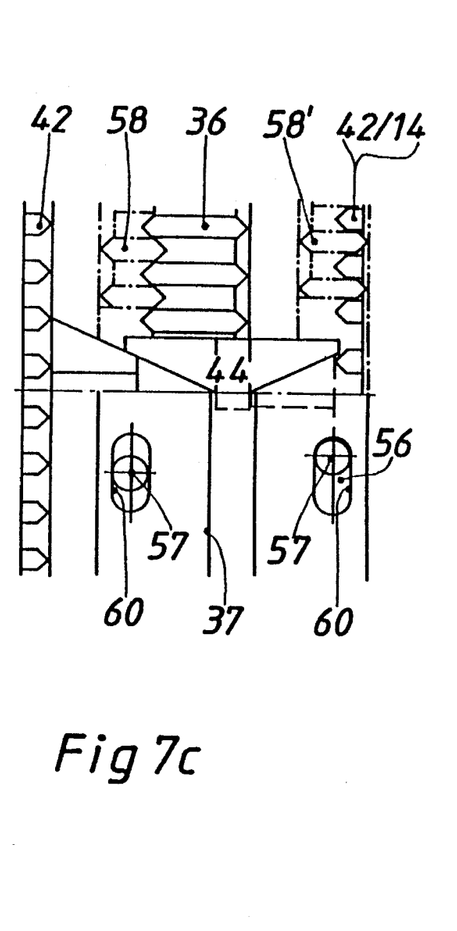
Figure 8:
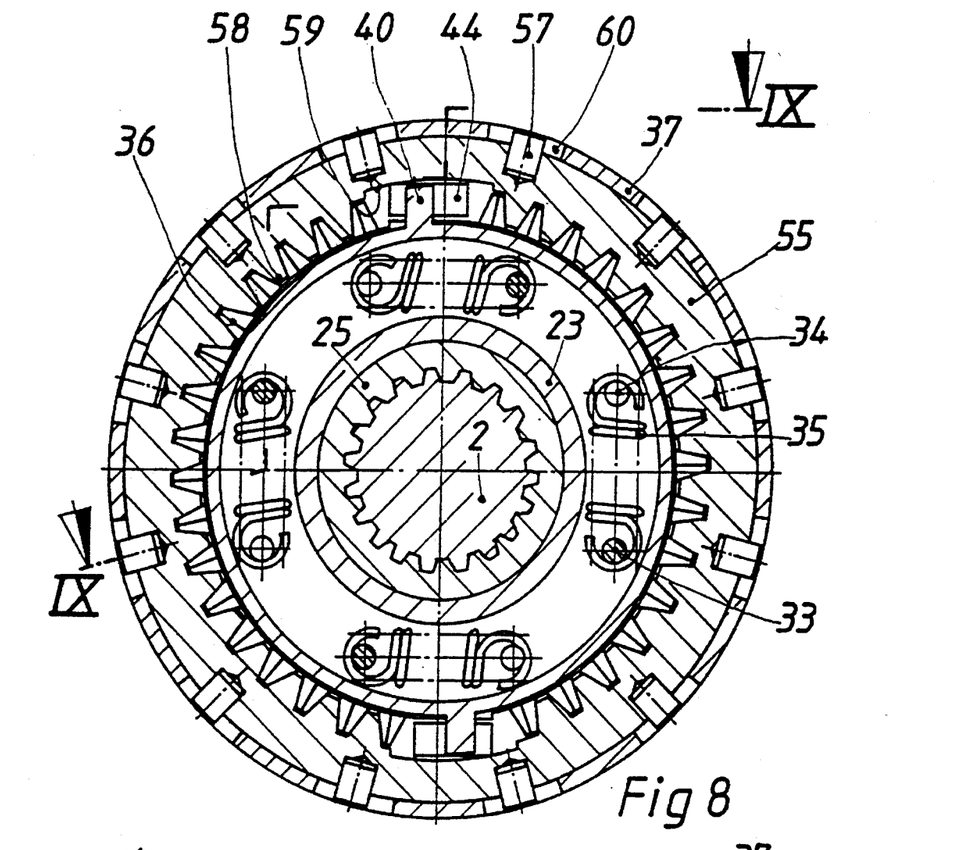
Figure 9:
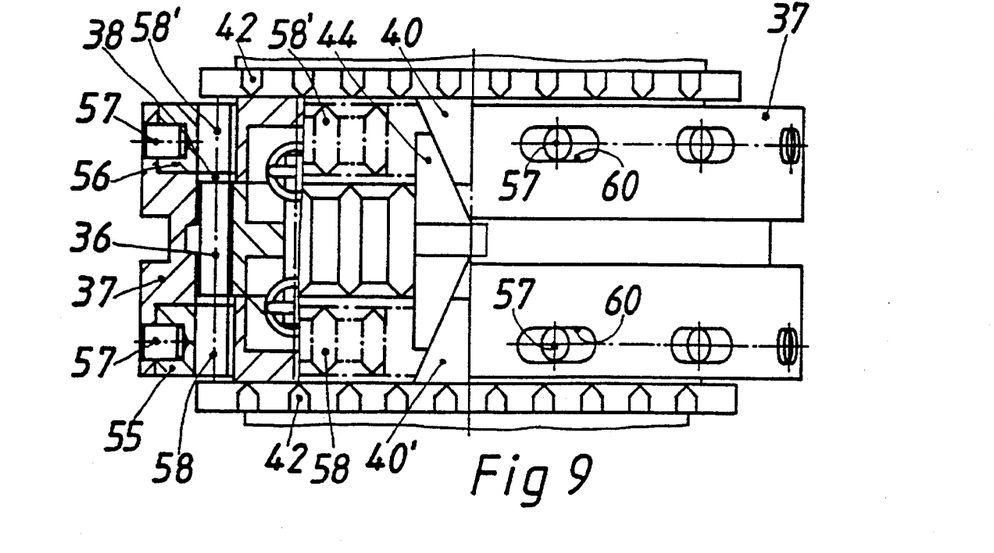
FIG. 9 which is a section along the line IX—IX in FIG. 8.

In FIGS. 7a, 7b, 7c the teeth 58, 58" of the synchronous rings 55, 56 are indicated by dash-dotted lines, because at the point indicated they are disposed above the drawing plane.

FIG. 7a shows the neutral center position. The shift bushing 37 and, along with it the sliding piece 44, are in the center. In the same way the synchronous rings 55, 56 and the teeth 58, 58' disposed on them are symmetrical in relation to the teeth 36 provided on the outside along the circumference of the synchronous body 27'.

FIG. 7b shows the displacement toward the right until frictional engagement (clamping). The shift bushing 37 and, along with it the gear rims formed by the teeth 58 or 58', has already moved a little to the right. It can also be seen that the tooth flanks of the teeth 58', pointing toward the right in the axial direction, do not "fit" exactly into the spaces between the teeth 42 of the second gear rim on the gear wheel 14.

FIG. 7c results from further axial displacement toward the right. The shift bushing 37 and, along with it the gear rims formed by the teeth 58 or 58', have been further displaced toward the right. At this time the right synchronous ring 56 was able to move a little along the circumference with respect to the shift bushing 37 (see the position of the right pin 57 in the elongated hole 60) and accordingly the teeth 58' were able to slide exactly into the gaps between the teeth 42 of the gear wheel 14. Thus, if the sliding piece 44 with the shift bushing 37 has reached the right end position, the teeth 58' of the right synchronous ring 56, which—within the limitation of the engagement of the pin 57 inside the elongated hole 60—is movably disposed on the shift bushing 37, engage the teeth 42 on the gear wheel 14, so that an interlocked connection has been achieved.

Displacement of the shift bushings 37 is performed in a known manner in that a finger 48 which is fastened on a shifting claw 49 engages a groove 47 on the shift bushing 37 which claw, in turn, is displaced in a known manner by means of a shift linkage generally indicated by 50. However, since its details are known to one skilled in the art or are easily discernible by one skilled in the art, it is not necessary here to describe them further.

As already mentioned above, the gear wheel 4 is not in direct contact with the gear wheel 13. Engagement instead takes place via a further gear wheel 51 on a shaft 53 seated in a wall 54 of the housing. This interposition is provided for the reversal of the direction of movement—since the gear wheel 13 is the one for the reverse gear—.

I claim:

1. A clutch for a gearbox, the gearbox including a shaft on which at least one gear wheel, having an inner surface, is disposed, said clutch being adapted to shift the at least one gear wheel into a shift position wherein the at least one gear wheel is fixedly connected to rotate in at least one direction of the shaft, and into a neutral position wherein the at least one gear wheel is freely rotatable relative to the shaft, said clutch comprising:

means defining clamping surfaces adapted to be situated about the circumference of the shaft and adjacent the inner surface of a respective gear wheel;

a plurality of clamping rollers adapted to be situated about the circumference of the shaft and to be disposed between the clamping surfaces and the inner surface of a respective gear wheel thereby defining a minimum displacement which is less than the diameter of the clamping rollers and a maximum displacement which is greater than the diameter of the clamping rollers;

a plurality of shifting disks;

a plurality of shifting rods, with at least one of said plurality of shifting rods being associated with each shifting disk, each shifting rod extending into a space between adjacent clamping rollers;

first spring means;

second spring means;

said plurality of shifting disks adapted to shift between a first position relative to the shaft into which said shifting disks are urged by said first spring means, and a second position relative to the shaft against the force of said first spring means;

a shift bushing associated with each shifting disk;

a sliding piece disposed on each of said shift bushings; and a synchronizing body on which each of said shift bushings is disposed, said synchronizing body adapted to be disposed on the shaft to be rotated therewith, while being axially displaceable relative thereto, wherein said second spring means push said clamping rollers into a frictional clamping position via said shifting rods when said associated shifting disk is displaced from said first position to said second position.

2. The clutch as defined in claim 1, wherein said means defining clamping surfaces comprises the shaft.

3. The clutch as defined in claim 1, wherein said means defining clamping surfaces includes a clamping roller support, said clamping roller support defining said clamping surface.

4. The clutch as defined in claim 1, wherein the gearbox includes a plurality of gear wheels each seated on a shifting rod of an adjacently disposed shifting disk.

5. The clutch as defined in claim 4, wherein a synchronous body is disposed between adjacent gear wheels, said synchronous body having a center bar on both sides of which are disposed a respective shifting disk, and wherein the shifting rods associated with each shifting disk extend into interior spaces of the gear wheels disposed on both sides of the synchronous body.

6. The clutch as defined in claim 5, wherein a forward gear wheel is disposed next to a reverse gear wheel for direct change from forward to reverse running.

7. The clutch as defined in claim 1, wherein each shifting disk forms part of a shifting disk body, said shifting disk body further having a further sliding piece which cooperates with said sliding piece for the displacement of said sliding disk body from said first position to said second position.

8. The clutch as defined in claim 7, wherein each shifting disk has bolts disposed thereon, and each synchronous body has bolts disposed thereon, and wherein said first spring means are disposed between the bolts disposed on said shifting disk and the bolts disposed on said synchronous body.

9. The clutch as defined in claim 8, wherein said first spring means are tension springs.

10. The clutch as defined in claim 8, wherein said tension springs are suspended between the bolts fastened to a corresponding shifting disk body and synchronous body, said tension springs pull its associated shifting disk body into a defined position relative to its associated synchronous body, said defined position being determined by the sliding pieces provided on the shifting disk body.

11. The clutch as defined in claim 9, wherein said tension springs are suspended between the bolts fastened to a corresponding shifting disk body and synchronous body, said tension springs pull its associated shifting disk body into a defined position relative to its associated synchronous body, said defined position being determined by the sliding pieces provided on the shifting disk body.

12. The clutch as defined in claim 7, wherein each shifting disk body is displaceable on an associated synchronous body.

13. The clutch as defined in claim 7, wherein each shift bushing includes internal teeth and each synchronous body includes external teeth which engage the internal teeth of an associated shift bushing, and wherein each sliding piece is fastened to its respective shift bushing.

14. The clutch as defined in claim 1, further comprising:

a pair of spaced apart synchronous rings associated with each shift bushing and displaceable circumferentially relative thereto, each synchronous ring having gear teeth, wherein:

each synchronous body, shift bushing and synchronous ring combination has a gear wheel adjacent each end, each gear wheel having a first set of gear teeth and a second set of gear teeth adjacent thereto; and the gear teeth of each synchronous ring engage the second set of gear teeth of an adjacent gear wheel when its associated combination is shifted toward that gearwheel.

15. The clutch as defined in claim 1, wherein said second spring means are leaf springs.

16. The clutch as defined in claim 15, wherein said leaf springs are bent into a U-shape, and wherein each shifting rod has a groove which secures one end of an associated leaf spring.

17. The clutch as defined in claim 1, wherein the shifting rods and the clamping rollers are dimensioned such that the shifting rods move their associated clamping rollers out of the clamping position.

18. The clutch as defined in claim 1, wherein each sliding piece includes two sliding surfaces which extend parallel to each other when associated with gear wheels of opposite directions of rotation, and extend oppositely and obliquely when associated with gear wheels of the same direction of rotation.

* * * * *